(12) United States Patent
Powers

(10) Patent No.: US 7,219,622 B1
(45) Date of Patent: May 22, 2007

(54) INSECT PROOF FOOD DISH

(76) Inventor: W. H. Powers, 1020-49th Ave., East, Bradenton, FL (US) 34203

(*) Notice: Subject to any disclaimer, the term of this patent is extended or adjusted under 35 U.S.C. 154(b) by 0 days.

(21) Appl. No.: 11/361,373

(22) Filed: Feb. 24, 2006

(51) Int. Cl.
*A01K 5/00* (2006.01)
*A01K 7/00* (2006.01)

(52) U.S. Cl. .................................. 119/61.53; 119/51.5

(58) Field of Classification Search ............... 119/61.5, 119/61.53, 61.54, 51.5, 61.56; 220/4.27, 220/23.83, 475, 574; 206/501; 211/126.12, 211/126.14, 131.1, 133.4; D7/507
See application file for complete search history.

(56) References Cited

U.S. PATENT DOCUMENTS

| | | | | |
|---|---|---|---|---|
| D160,688 S | * | 10/1950 | Brock | D7/501 |
| 3,441,003 A | * | 4/1969 | Du Mond et al. | 119/61.53 |
| 3,756,462 A | * | 9/1973 | Cain | 220/23.83 |
| 4,128,080 A | * | 12/1978 | Haney | 119/51.5 |
| 4,953,506 A | * | 9/1990 | Sanders | 119/61.53 |
| 5,253,609 A | * | 10/1993 | Partelow et al. | 119/61.53 |
| 5,619,952 A | * | 4/1997 | Walker | 119/61.53 |
| 6,125,790 A | * | 10/2000 | Breedwell | 119/51.5 |
| 6,860,229 B1 | | 3/2005 | Craft | |

* cited by examiner

Primary Examiner—Robert P. Swiatek

(57) ABSTRACT

A food dish separable into two parts and having a central tapered post construction that provides a secure, self-adjusting, and non-wobbling fit of upper and lower members together while they are connected, but which permits easy separation thereof when needed to clean the upper food-holding member. The upper and lower members are substantially similar in diameter dimension so that animals do not have access to the contents of the lower member. It is contemplated for the lower member to hold a fluid or viscous material that prevents crawling insects, particularly ants, from gaining access to food in the upper member. Applications may include, but are not limited to, use with cat food, dog food, and food for puppies and other animals that is made continuously available for on-demand consumption, and to keep crawling insects out of food scraps and residue left in food dishes after an animal has eaten.

9 Claims, 1 Drawing Sheet

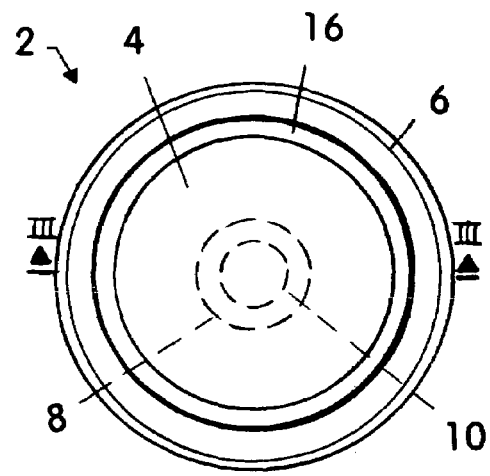
FIG. I
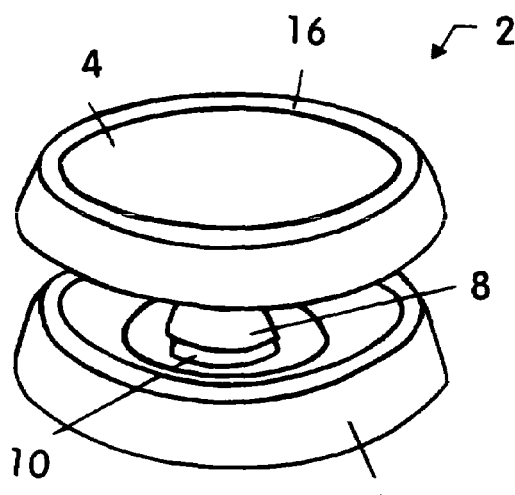
FIG. IV
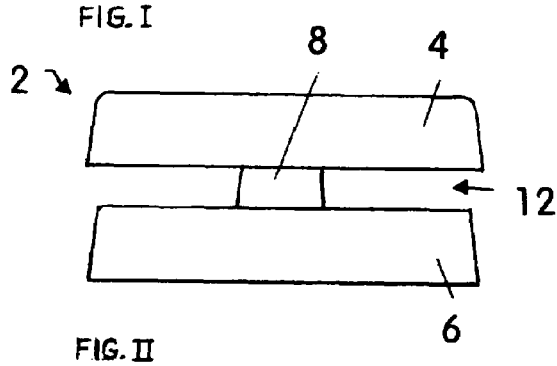
FIG. II
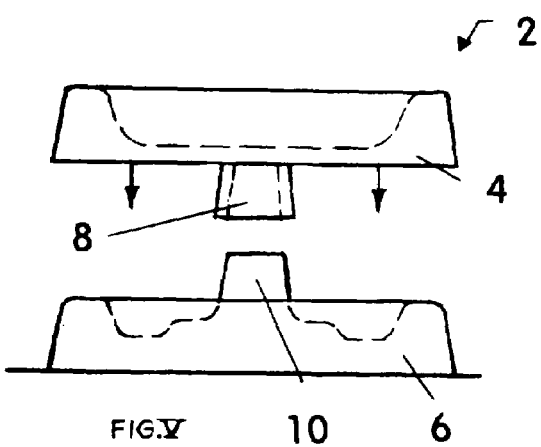
FIG. V
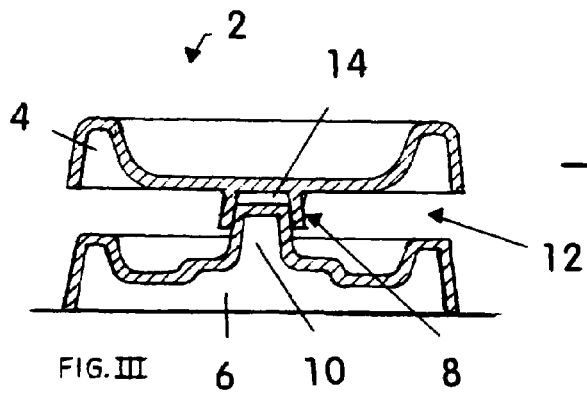
FIG. III

INSECT PROOF FOOD DISH

CROSS-REFERENCES TO RELATED APPLICATIONS

None

BACKGROUND

1. Field of the Invention

This invention relates to the field of food dishes for pets and other animals, specifically to a two-part pet dish having a central tapered post construction that provides a secure and non-wobbling fit of top and bottom members together while they are connected, but which permits easy separation thereof when needed to clean the upper food-holding member. Top and bottom members are substantially similar in diameter dimension so that the animal does not have access to the contents of the bottom member. It is contemplated for the bottom member to hold a fluid or viscous material that prevents crawling insects, particularly ants, from gaining access to food in the top member. Applications may include, but are not limited to, use with cat food, dog food, and other pet food that is typically placed on a floor or ground surface accessible by crawling insects, and food for puppies and other animals that is made continuously available during the day or night for on-demand consumption.

2. Description of the Related Art

In domestic and other settings, food is often left out in a dish for animals for extended periods of time, so that they have food continuously available to them and are able to eat when hungry. Although doing so provides a benefit for the animals, it often attracts crawling insects and other undesirable pests. In areas where crawling insects are abundant, they can reach the food within minutes and before the animal can completely consume it. Further, even when it is not intended for a food dish to remain out for extended periods of time, after the animal consumes the food and before the person providing the food can return to collect the food dish, crawling insects can be attracted to the food or food residue in the dish and additional time must be taken to remove the crawling insects from the food dish before it is stored for a next use. To overcome these problems, many insect-resistant and insect proof pet dishes are known. One dish of interest is the pet food bowl in U.S. Pat. No. 6,860,299 to Craft (2005). It discloses a double level food bowl having three parts, a lower water container with a central recess on its top side, an upper food dish smaller in diameter than the water container and having a central recess on its bottom side, the upper food dish also having an indentation that provides a void space for an animal to drink water from the lower container, and an elongated central post that is configured to be inserted into the two recesses for support of the upper food dish above the water container and sufficiently separated the upper food dish from the lower water container so that the animal using it can gain access to the water. The present invention is different from the Craft invention for several important reasons. The present invention has fewer parts, with its supporting tapered post securely fixed to its bottom member. The tapered construction of the present invention post is self-adjusting and permits quick release of the top member from the bottom member. Separation of the Craft food dish from its water container either requires the disassembly of connecting threaded parts, which is time consuming, or in the alternative requires one to handle two or more of the three separable pieces without spilling the water in the lower container. Further, the structure of the Craft invention is more expensive to manufacture. In addition, the upper and lower members of the present invention are purposefully similar in diameter dimension, and the tapered post connected to the bottom member of the present invention is purposefully short, to allow the upper member to block access of animals to the lower member's contents. Should an animal drink all of the water out of the Craft lower container, the ant proof capability of the Craft food dish is defeated. The lack of access to the contents of the bottom member in the present invention permits the use of a variety of insect resisting substances in the lower member, including oil and viscous materials. However, it is preferred that any substance used in the bottom member of the present invention be non-toxic to animals in the event that it be inadvertently upended. No other pet dish is known that functions in the same manner or provides all of the advantages of the present invention.

BRIEF SUMMARY OF THE INVENTION

The primary object of this invention to provide an insect proof food dish for pets that allows a pet owner to leave out food during the day or night for the pet without the food or food residue in the dish attracting ants and other undesirable crawling insects. Another object of this invention is to provide a pet dish with durable construction and easily washable upper and lower members. It is a further object of this invention to provide a pet dish having a configuration that makes it resistant to being upended so that it is not easily spilled by animals making inadvertent contact with it. It is also an object of this invention to provide a pet dish that blocks animal access to the lower member that holds the insect-deterring substance or composition.

The present invention, when properly made and used, will provide a two-part pet dish having a central tapered post construction that provides a secure and non-wobbling fit of upper and lower members together while they are connected, but which permits easy separation thereof when needed to clean the upper food-holding member. Upper and lower members are substantially similar in diameter dimension and configuration so that the animal using it does not have access to the contents of the lower member. It is contemplated for the lower member to hold a fluid or viscous material that prevents crawling insects, particularly ants, from gaining access to food in the upper member. Applications may include, but are not limited to, use with cat food, dog food, and food for puppies and other animals that is made continuously available for on-demand consumption. insect proof pet dish to allows a pet owner to leave out food during the day or night without also attracting undesirable ants and other insects. The present invention pet dish is preferably made from sturdy molded plastic for a durable construction and upper and lower members that are readily washable. The slight downward flare to the sides of the upper and lower members respectively restrict access to the insect-deterring substance or composition in the lower member and provide a pet dish that is not easily spilled by animals making inadvertent contact with it.

The description herein provides preferred embodiments of the present invention but should not be construed as limiting its scope. For example, variations in the diameter dimensions of the upper and lower members as long as both have substantially the same diameter dimension, the shape of the upper and lower members as long as both are substantially the same; the height of the tapered post as long as it is not so large as to allow animal access to any contents in the lower member; the diameter dimension of the tapered post; and the amount of outward flare of the sides of the lower member relative to a supporting surface as long as such flare reduces movement of the lower member relative to the supporting surface as a result of inadvertent animal contact, and the amount of outward flare of the sides of the upper member as long as such flare assists in preventing animal access to contents in the lower member, other than those shown and described herein, may be incorporated into the present invention. Thus the scope of the present invention should be determined by the appended claims and their legal equivalents, rather than being limited to the examples given.

BRIEF DESCRIPTION OF THE DRAWINGS

FIG. 1 is a top view of the most preferred embodiment of the present invention having an upper food-holding member and a central supporting post beneath it.

FIG. 2 is a side view of the most preferred embodiment of the present invention showing the self-adjusting tapered central post between an upper food-holding member and a lower member configured to contain insect-deterring substances and materials.

FIG. 3 is a sectional view of the most preferred embodiment of the present invention also showing the self-adjusting tapered central post positioned between an upper food-holding member and a lower member configured to contain insect-deterring substances and materials.

FIG. 4 is a perspective view of the most preferred embodiment of the present invention.

FIG. 5 is an exploded view of most preferred embodiment of the present invention having two easily assembled and easily separated parts.

DETAILED DESCRIPTION OF PREFERRED EMBODIMENTS

FIGS. 1–5 show the most preferred embodiment of the present invention food dish 2 that prevents crawling insects (not shown) from reaching contents (not shown) placed into an elevated food-holding member 4 that is supported upon a lower member 6 of similar size and dimension that contains one or more insect-deterring substances or materials (not shown) of sufficient quantity to prevent crawling insects from reaching tapered center post 10 and then climbing upward over the outer surface of tapered recess 8 to reach food or food residue (not shown) in elevated food-holding member 4. Although variations can include recess 8 depending upwardly from lower member 6 and post 10 downwardly depending from elevated/upper food-holding member 4, the embodiment shown in FIGS. 1–5 is most preferred. One should recognize that the illustrations herein are not to scale, and only generally represent the preferred structure, proportion, and placement of present invention components. Thus, the illustrations herein should not be relied upon for determining size and/or configuration limitations, and the scope of the present invention should be determined by the appended claims and their legal equivalents, rather than being limited to the examples given.

FIG. 1 shows the most preferred embodiment of the present invention having an elevated/upper food-holding member 4 that is substantially circular in perimeter configuration. Although the circular configuration shown is not critical, it is preferred. Other configurations can include but not limited to oval, elliptical, hexagonal, and octagonal configurations. Size is not a limitation of food dish 2 and differing sizes of present invention can be manufactured for different sizes of animals and pets, even sizes that are large enough for circus animal use. Centrally and in broken lines, FIG. 1 shows a post 10 beneath elevated/upper food-holding member 4 that is substantially concentric to and positioned within a recess/socket 8 to provide a means of easily separating elevated/upper food-holding member 4 from its supporting lower member 6 so that either elevated/upper food-holding member 4, supporting lower member 6, or both may be cleaned. For ease of manufacture, elevated/upper food-holding member 4 and supporting lower member 6 would probably be made from the same material or materials, however this is not critical. In the most preferred embodiment of the present invention, elevated/upper food-holding member 4 and supporting lower member 6 are made of plastic via molded construction. It is important for the materials used for elevated/upper food-holding member 4 and supporting lower member 6 to be washable and durable. Further, as can be seen from FIG. 1, the sides of elevated/upper food-holding member 4 flare outwardly from top edge 16, to prevent access of an animal to the insect-deterring contents of supporting lower member 6. The lower member 6 may not always be visible when looking directly down on elevated/upper food-holding member 4, however, FIG. 1 does show a small portion of lower member 6 visible around it. Since it is contemplated in most preferred embodiments of present invention food dish 2 for elevated/upper food-holding member 4 and supporting lower member 6 to be substantially similar in perimeter dimension, the visible portion of lower member 6 in most embodiments would represent a flare configured to prevent food dish 2 from being pushed across a floor by a hungry pet (not shown), or from being easily upended by inadvertent contact by a large or overly active animal.

FIG. 2 shows the most preferred embodiment of the present invention food dish 2 having a central support, which in FIG. 3 is shown to comprise a tapered central post 10 upwardly depending from the top surface of supporting lower member 6 that is partially inserted into a complementary central tapered recess 8 that downwardly depends from the bottom surface of elevated/upper food-holding member 4. The tapered configuration of central post 10 gives it a reduced distal diameter. Therefore, to connect post 10 to recess 8, one simply inserts post 10 into recess 8 until post 10 can advance no further. The slip joint thus created is self-adjusting and provides a secure and stable connection for elevated/upper food-holding member 4, and will not permit it to wobble relative to supporting lower member 6. It is contemplated that the degree of taper for post 10 and recess 8 to achieve a zero degree tolerance to be similar to a Morris taper used on lathe tools for quick operation and a positive fit. During the connection of elevated/upper food-holding member 4 and supporting lower member 6, in the most preferred embodiment of the present invention an air gap 12 remains between them of sufficient size so that crawling insects cannot directly travel upwardly from supporting lower member 6 to elevated/upper food-holding member 4. Although not limited thereto, the minimum air gap 12 in the most preferred embodiment of the present invention would be approximately three-fourths of an inch. However, air gap 12 should not be so large as to allow nearby animals or children to have easy access to the insect-deterring substances and materials in supporting lower member 6. Thus, when lower member 6 contains insect-deterring substances and materials, crawling insects and other pests too small to directly reach elevated/upper food-holding member 4 are prevented from reaching post 10 and the outer surface of recess 8 to use either one to gain access to food or food residue in elevated/upper food-holding member 4. The insect-deterring substances or materials used in supporting lower member 6 should be non-toxic in the event food dish 2 is overturned for any reason. However, the type of insect-deterring substances or materials used can vary widely and include but not be limited to food-grade oils, soap solutions, water, water-based products, and gels having a tacky surface.

FIG. 3 shows is a sectional view of the most preferred embodiment of the present invention with the self-adjusting tapered central post 10 positioned between elevated/upper food-holding member 4 and supporting lower member 6. The positive, non-slip, strong, non-wobble connection of tapered post 10 to complementary tapered recess 8 is disclosed. As shown in FIG. 3, to provide the non-wobble connection, the tapers of post 10 and recess 8 do not permit post 10 to completely fill the interior space within recess 8. Further, FIG. 3 shows lower member 6 being configured with a moat-like area where insect-deterring substances and/or materials (not shown) can be maintained to prevent crawling insects and other small pests from reaching food or food residue in elevated/upper food-holding member 4.

FIGS. 4 and 5 also show the two easily assembled and easily separated member 4 and 6 in the most preferred embodiment of the present invention. The tapered design of post 10 has advantages over other insect-deterring food dishes. First, it has only two pieces, member 4 and 6, to manipulate. Also, it is self-adjusting for long wear and stability. Further, the tapered connection of post 20 to complementary tapered recess 8 is quick-release for easy cleaning. Further, the quick-release connection makes the present invention food dish 2 economical to manufacture and market. In addition, due to the similar perimeter dimensions and configurations of elevated/upper food-holding member 4 and supporting lower member 6, the insect-deterring substances and materials used in lower member 6 are not readily available to the animal or pet intended for using food dish 2, or small children who may be present around food dish 2, allowing the use of oil products that would evaporate less rapidly in warm climates or inside heated buildings. Thus, with the use of non-toxic oil products, maintaining adequate levels of insect-deterring substances and/or materials within lower member 6 is generally not so time consuming as when water-based products are used.

What is claimed is:

1. A two-part dish configured to keep crawling insects away its food contents, said dish comprising:
   a food-holding member having a top perimeter and a bottom perimeter, with said top perimeter having a smaller diameter dimension than said bottom perimeter to produce an outwardly extending bottom flare;
   a support member having a topmost perimeter and a bottommost perimeter, with said topmost perimeter having a smaller diameter dimension than said bottommost perimeter to produce an outwardly extending bottom flare, said bottommost perimeter of said support member also having a diameter dimension similar to that of said bottom perimeter of said food-holding member, and said support member also configured to hold insect-deterring substances; and
   attachment means adapted for supporting said food-holding member above said support member at a spaced-apart distance that prevents insects on said support member from crawling directly upward to said food-holding member and also prevents a consumer of food associated with said food-holding member from gaining access to the insect-deterring substances associated with said support member, said attachment means comprising an upwardly-directed tapered post associated with said support member and a female opening associated with said food-holding member, said female opening having a tapered internal configuration and dimension for receiving said tapered post in a manner that creates said insect-deterring spaced-apart distance, provides a secure and non-wobbling connection that is self-adjusting, and provides a connection that allows said tapered post to be easily and promptly withdrawn from said female opening, whereby when said tapered post is secured within said internally tapered female opening, when food contents are associated with said food-holding member, and when insect-deterring substances are associated with said support member and encircle said tapered post, said outwardly extending flare of said support member stabilizes it against a surface supporting it, insect-deterring substances associated with said support member prevent insects from using said tapered post to reach food contents associated with said food-holding member, and said outwardly extending flare of said food-holding member prevents the intended consumer of the food contents from gaining access to the insect-deterring substances associated with said support member.

2. The dish of claim 1 wherein said food-holding member and said support member have height dimensions selected from a group consisting of similar height dimensions and non-similar height dimensions.

3. The dish of claim 1 wherein said topmost perimeter of said support member also has a diameter dimension similar to that of said top perimeter of said food-holding member.

4. The dish of claim 3 wherein said food-holding member and said support member both have similar height dimensions.

5. The dish of claim 1 wherein said attachment means is centrally located relative to said food-holding member and said support member.

6. The dish of claim 1 having a molded construction.

7. The dish of claim 1 wherein said food-holding member has a bottom surface and said female opening depends downwardly from said bottom surface and extends beyond said bottom surface.

8. The dish of claim 1 wherein said support member has a top surface and said tapered post extends beyond said top surface.

9. The dish of claim 1 wherein said food-holding member has a bottom surface and said support member has a top surface, wherein said female opening depends downwardly from said bottom surface and extends beyond said bottom surface, and further wherein said tapered post extends beyond said top surface sufficiently to create and maintain said insect-deterring spaced-apart distance between said food-holding member and said support member.

* * * * *